United States Patent [19]
Blume

[11] Patent Number: 5,870,172
[45] Date of Patent: Feb. 9, 1999

[54] APPARATUS FOR PRODUCING A VIDEO AND DIGITAL IMAGE DIRECTLY FROM DENTAL X-RAY FILM

[76] Inventor: Stephen T. Blume, 25462 Wagon Wheel Cir., Laguna Hills, Calif. 92653

[21] Appl. No.: 683,510

[22] Filed: Mar. 29, 1996

[51] Int. Cl.[6] .................................................. G03B 27/52
[52] U.S. Cl. ............................ 355/27; 396/569; 396/639
[58] Field of Search ..................................... 396/569, 639, 396/636, 641; 358/547; 355/27–29

[56] References Cited

U.S. PATENT DOCUMENTS

| | | | |
|---|---|---|---|
| 4,965,601 | 10/1990 | Canty | 348/81 |
| 5,101,286 | 3/1992 | Patton | 358/487 |
| 5,432,579 | 7/1995 | Tokuda | 355/27 |

Primary Examiner—D. Rutledge
Attorney, Agent, or Firm—Peter J. Gluck; Manfred E Wolff

[57] ABSTRACT

A film digital radiological imaging apparatus to capture the image formed on a dental x-ray film during its developing process and convert it into a video and digital image, while allowing the completed development of the x-ray film, comprising a reaction tank having a window of tinted-clear material to allow a video camera to capture the image forming on a film during its development. A computer programmed to accept the image and to allow the image to be digitized for storage, modification, and transmission to a video monitor for display, or to a printer for printing is also provided. A method for capturing the image forming on dental x-ray film during the opaque stage of the development process and converting it into a video and digital image comprising developing the film to form an opaque image, capturing the image with a video camera, and transferring the image to a computer for digitizing, to a monitor for viewing, zooming, or further enhancing, and to a printer for printing is further provided.

2 Claims, 1 Drawing Sheet

APPARATUS FOR PRODUCING A VIDEO AND DIGITAL IMAGE DIRECTLY FROM DENTAL X-RAY FILM

FIELD OF THE INVENTION

This invention relates generally to the production of a video and digital image of the picture on a developing dental x-ray film along with a hard copy picture through the use of a developer tank with a clear tinted window and a picture enhancing video camera.

BACKGROUND OF THE INVENTION

Current technology for creating a digital radiological image of a patient's teeth utilizes a sensor card which is configured to be sensitive to x-rays and electronically connected to a computer thence to a video monitor and/or a printer. The sensor card is placed in the patient's mouth behind the area to be x-rayed. An x-ray head is then aimed at the teeth in question. The x-ray head is then activated, the radiation going through the teeth and onto the sensor card. The sensor card sends the image created to a computer. The computer then digitizes the image. Once it is digitized, it can then be sent to a printer for the production of a hard copy "picture". Or, it can be sent to a video monitor. Because the image is digitized, it can be further enhanced for greater clarity. It can be zoomed in or out, inverted, contrasted with different intensities, or color switched, black to white, and white to black.

Advantages of digital radiology over film radiology are: (1) The fact that a darkroom is not needed for hard copy production. (2) The image is rapidly produced on a video screen, saving the operator time. (3) It has the ability to send the image via E-mail or the internet to insurance companies or other practitioners for diagnosis and consultation due to the fact that the image is digitized. (4) It uses an extremely small dosage of radiation. (5) Patients can see problems on a picture on hard copy paper or a monitor much more readily than on a small and negative film radiograph, making case presentations much more understandable.

The disadvantages of digital radiological imaging are the following: (1) The pictures which appear on the video screen are quite fuzzy and not of clear quality. (2) The hard copy produced is also of poor quality. It is difficult for the practitioner to see much detail. Film radiographs are far superior in quality and resolution. (3) Digital radiological imaging is advantageous for only one or two films. It is not possible to take a full set of radiographs, eighteen to twenty-two films, (or even four bite-wing films) and view them clearly on a video monitor. Each individual radiograph is too small when all are viewed as a whole, considering the comparatively poor quality of video imaging. It is very difficult to be constantly zooming in and out to different individual pictures. When a dentist has a full set of "film" radiographs in front of him, his eyes can be constantly scanning from film to film to contrast and compare different areas, which greatly aids him in the diagnosis. This just cannot be done when a full set of radiographs is on a video screen. (4) Ergonomically, the hard copies produced on the printer are extremely difficult to view and diagnose, when in groups of eighteen to twenty-two, and to store. Viewing the pictures is like viewing a stack of photographs. The bigger the stack gets, the more awkward the handling. Storing the hard copies in the patients' charts, which must be done in case the computer hard disk breaks down or is destroyed, becomes cumbersome over time, because the stack of hard copies gets thicker and more cluttered. (5) While, at the writing of this patent, the inventor realizes that the costs of technology usually gets less expensive as time goes on, the current digital radiological technology is electronically complex and prohibitively expensive, and is simply out of reach for a majority of practitioners. (6) The sensor card, which goes into the patient's mouth, is an extremely fragile and costly piece of equipment which cannot be sterilized or it would be destroyed. It must be covered by a small baggie every time it is used to prevent transmission of pathogens from patient to patient. This technique is of questionable safety, considering pathogens can be transferred from baggie to baggie as they are changed. Because it is a piece of electronic equipment, it cannot be bent to conform to the patient's mouth, as can a piece of film. This may cause great discomfort to the patient.

SUMMARY OF THE INVENTION

Clearly, then, there is a need for a device that can produce quality video images, quality hard copy images, and quality radiographic film images. A technically simpler device than that used by current digital radiology would make the cost of purchase of such a device more accessible to health practitioners. The present invention fulfills these needs.

The present invention is an apparatus which will produce a video image, a digital image, a hard copy picture, and allow for production of a high quality radiographic film. In accordance with the preferred embodiment of the present invention, there is provided a film processing tank with an image enhancing video camera mechanically attached in such a way that said video camera is in good focus and can capture the image forming on the film being processed.

The first step in the making of a radiographic film is the exposure of the film in the patient's mouth. This exposed film is then transferred to a darkroom or daylight loader where the film covering packet is removed. Next, by manual or automated means, it is placed in a tank where developing chemicals and water sequentially bathe the film. Typically, the first chemical is developer solution. When this solution is in contact with the film, an opaque image of the teeth (or whatever the radiographic subject is) forms, much like a normal black and white photograph. We shall denote this stage of development the opaque stage. Next, depending on the system used, the film may be water washed. The fixative solution bathes the film. At this time the film turns into a "negative". The image seems to gradually disappear. The film is no longer opaque, but it is black and transparent-translucent. At this time, the image on the film is difficult to view, unless it is held over a viewing light. This invention takes advantage of the opaque stage of the film developing process. This process which utilizes the opaque stage of film development will be denoted film digital imaging.

Typically, dental film processing tanks are made of stainless steel or plastic material which is totally opaque. The processing tank used in film digital imaging has a window composed of a clear see-through material (which is tinted to prevent light damage of the film) on one or more sides which will allow for the viewing of the opaque stage of film developing. Current video technology has created cameras which greatly enhance the images they capture. These cameras typically take many pictures per second, and improve that picture electronically. This type of image enhancing video camera is mechanically attached to the tank, in such a position that it is able to capture the opaque image that will form in the film. Said film, which has previously been exposed in the patient's mouth, is placed on a holder and then into the windowed tank. The tank may be already filled with developer solution, or developer solution may be flowed into it. As the image forms on the film, and the film is in its opaque stage, the video camera is activated and a video image is captured. This image may be simply sent to a monitor where it can be viewed by the operator. Better, it may be sent to a computer where it is digitized. It can then be further enhanced and sent to a printer for hard copy printing, and/or it may be viewed on the computer monitor. There, through the use of computer programming it can be altered in many different ways that will greatly enhance the diagnostic capabilities of the practitioner. It may also be stored on the computer hard drive for future use.

Once the image has been captured from the opaque stage, the developing of the film may continue in normal fashion. The film is bathed in fixer solution, then washed and dried. The effect of the present invention is to give the operator not only a high resolution digital image, but also a high quality dental film radiograph for diagnosis and storage.

Figure 1:
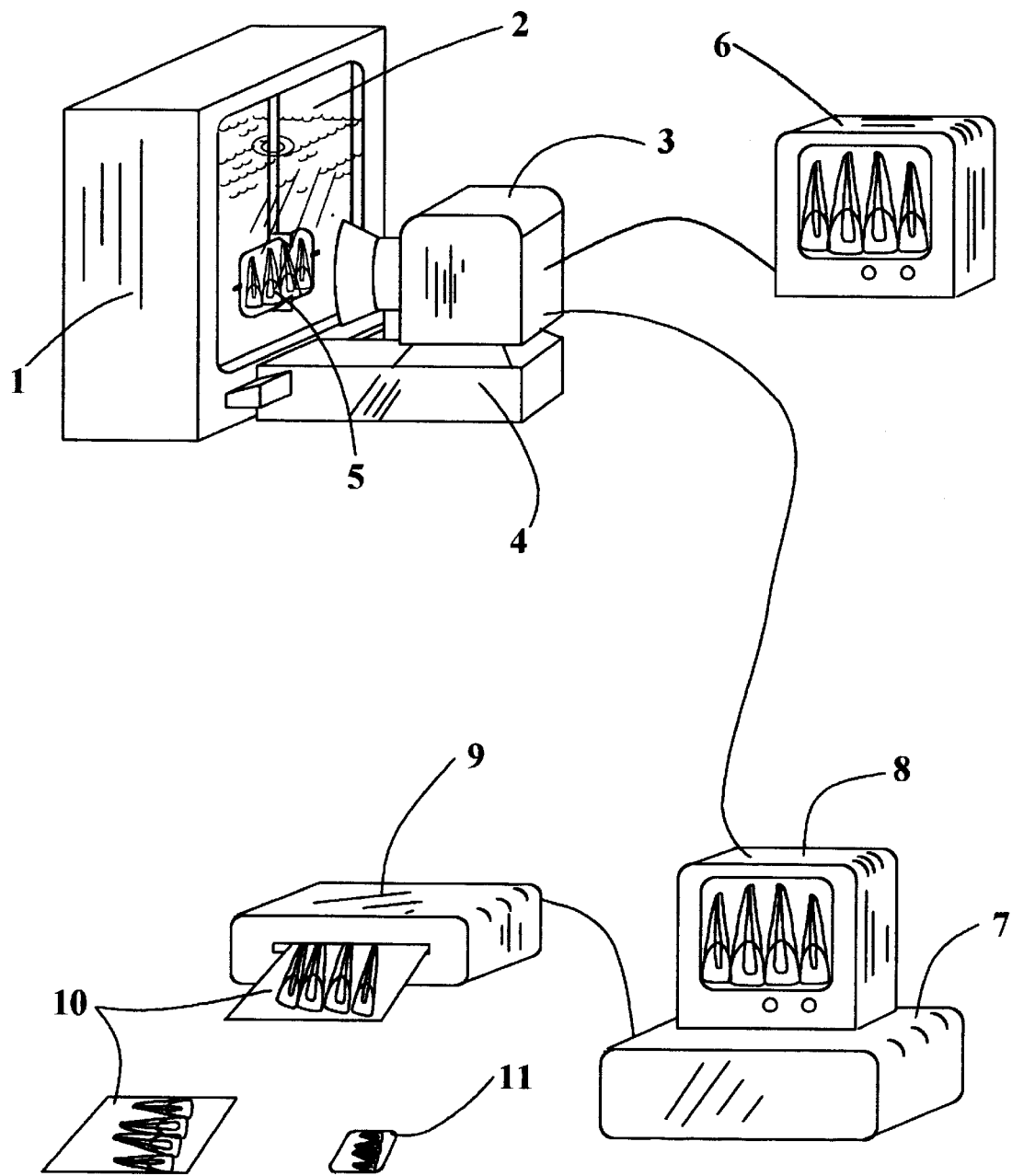
FIG. 1 is a plan view of the apparatus for producing a video and digital image directly from dental radiographic film according to the present invention.

REFERENCE NUMERALS IN DRAWINGS 1 processing tank.
2 tinted-clear window which allows the camera to capture the image of the film in the opaque stage of film processing.
3 image enhancing camera which captures the opaque stage picture-like image on the film and electronically improves the resolution.
4 holding device which holds and aligns the camera.
5 film in its opaque stage, showing the picture-like image formed.
6 video monitor utilized for viewing directly from the video camera.
7 computer which will accept the image from the camera which will then digitize it. It may be then further enhanced, sent to the monitor for immediate viewing sent to the printer for hard copying, and/or stored on the hard drive.
8 computer monitor for viewing the captured image after it has been altered and enhanced in the computer.
9 printer utilized to make hard copies of the captured image.
10 hard copy of the film image.
11 finished high quality film from the continued normal developing procedure after the image capture in the opaque stage.

DETAILED DESCRIPTION OF PREFERRED EMBODIMENT

Referring now to FIG. 1 wherein the showings are for the purpose of illustrating a preferred embodiment of the present invention only and not for the purposes of limiting the same.

First, an exposed film 5 is placed in a processing or reaction tank 1. Tank 1 has a clear-tinted window 2 on one or more sides which allows the viewing of the image which forms on film 5 in the opaque stage. Tank 1 is prefilled with developer solution, or has developer solution flowed into it after film 5 is placed within. An image enhancing video camera 3 is mechanically attached to tank 1 through the use of an attachment device 4. Camera 3 is configured in such a position in relation to reaction tank 1 and film 5 so that it may capture with good focus the image forming on film 5 in its opaque stage. As the developer solution bathes film 5, a video camera 3 is activated to capture the image forming on film 5. The image may then be sent directly to a video monitor 6 for immediate viewing via an electronic cable connection. Or the image may be sent to a computer 7 where it is digitized. It then can be further enhanced and sent to a computer monitor 8 for altering and viewing as the operator desires. It may also be sent to a printer 9 where a hard copy 10 is made. The image may be stored on the hard disc of computer 7 for future viewing. Film 5 continues through its developing cycle in this apparatus to yield not only a video and digital image, and a paper hard copy, but also a finished high quality radiological film 11.

This apparatus may be utilized as an integral part of an automated film developing system or a manual developing system. Additional modifications and improvements of the present invention may also be apparent to those skilled in the art. Thus, the particular combination of parts described and illustrated herein is intended to represent only one embodiment of the invention and is not intended to serve as limitations of alternative devices within the spirit and scope of the invention.

What is claimed is:

1. A film digital radiological imaging apparatus which will capture the image formed on a dental x-ray film during its developing process and convert the image into a video and digital image, while still allowing for the completed developing of said dental x-ray film, comprising:

a reaction tank, which is an integral part of an automated or manual film processing system, capable of holding developer solutions; sized and configured to receive at least one x-ray film with holder, said reaction tank defining a front, back, and side walls, at least one of which is composed of a window of tinted-clear material which will allow a properly configured and mounted video camera to capture the image forming on said film while the film is being developed;

one or more video cameras configured and mounted in such a way so that the image forming on the film when said film is bathed by developer solutions in said reaction tank will be captured by said video camera(s);

a mounting device which will hold said camera(s) in said configuration which will allow for the capture of the image forming on said film during development procedures;

a computer programmed to accept the image sent to said computer from said video camera which will allow said image to be digitized for the storage and modification of said image and allow the image to be sent to:

a video monitor which is electronically coupled with said computer which will display a video image of said film image;

a printer which is electronically coupled with said computer which will form a paper hard copy of said film image;

a control means operable to cause said video camera to activate as desired by the operator when developer solutions bathe the exposed film in said reaction tank forming said image.

2. A method of capturing the image forming on dental x-ray film during developing procedures and converting the image into a video and digital image comprising:

transferring previously exposed dental x-ray film and holder into a reaction tank with a clear-tinted window, allowing said film to be bathed in developer solution creating an image on said film;

activating a video camera which is configured and mounted so that said image forming on said film can be captured by said video camera through said clear-tinted window;

capturing said film image by said video camera;

transferring said captured image to a video monitor for viewing via electronic means;

transferring said captured image via electronic means to a computer for digitizing so that said captured image may be stored, further enhanced, displayed on a computer video monitor where the captured image may be altered and improved, and sent to a printer for paper hard copy production.

* * * * *